Feb. 27, 1951 J. KLUDT ET AL 2,543,370
SPRING COILING AND ASSEMBLING
Filed March 15, 1948 6 Sheets-Sheet 1

Jonathan Kludt,
Howard Parks,
Inventors.
Haynes and Koenig
Attorneys.

Feb. 27, 1951 J. KLUDT ET AL 2,543,370
SPRING COILING AND ASSEMBLING
Filed March 15, 1948 6 Sheets-Sheet 2

Jonathan Kludt,
Howard Parks,
Inventors.
Haynes and Koenig
Attorneys.

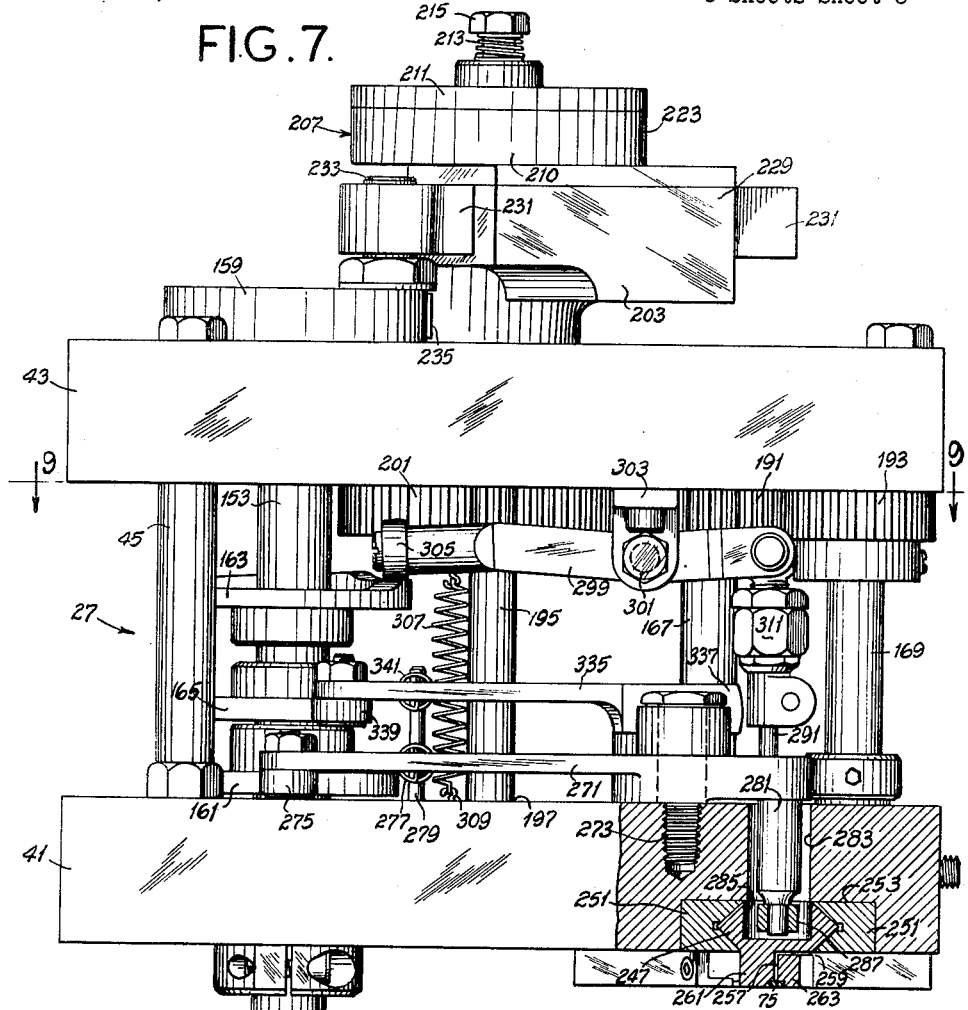
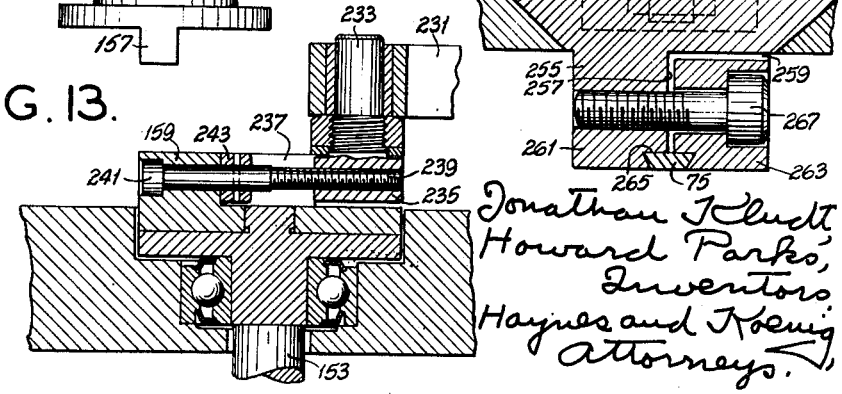

Feb. 27, 1951 J. KLUDT ET AL 2,543,370
SPRING COILING AND ASSEMBLING
Filed March 15, 1948 6 Sheets-Sheet 4

Jonathan Kludt,
Howard Parks,
Inventors.
Haynes and Koenig
Attorneys.

Feb. 27, 1951 J. KLUDT ET AL 2,543,370
SPRING COILING AND ASSEMBLING
Filed March 15, 1948 6 Sheets-Sheet 5
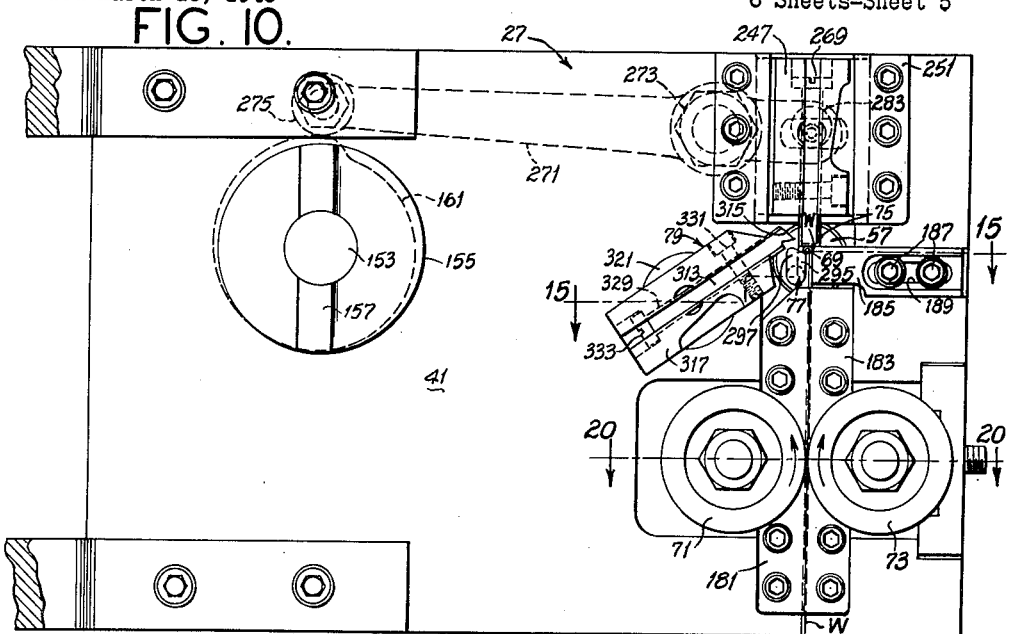
FIG. 10.
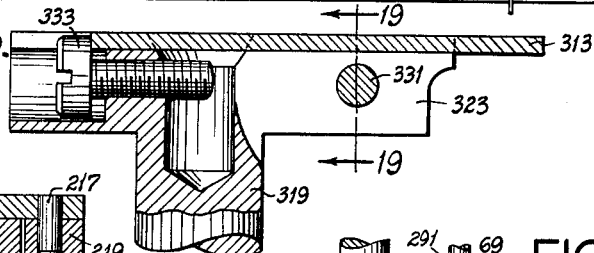
FIG. 18.
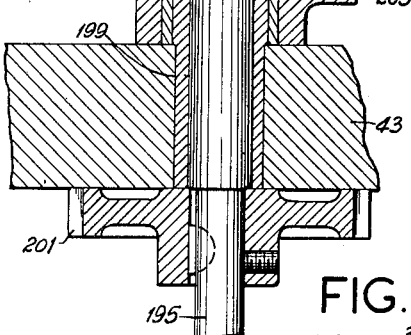
FIG. 17.
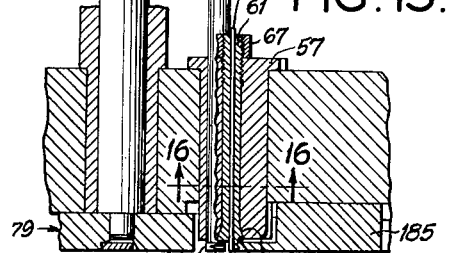
FIG. 15.
FIG. 16.
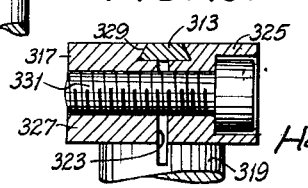
FIG. 19.
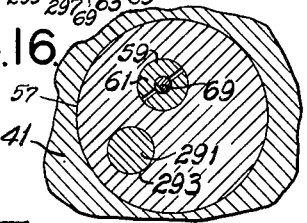
Jonathan Kludt,
Howard Parks,
Inventors
Haynes and Koenig
Attorneys.

Feb. 27, 1951 — J. KLUDT ET AL — 2,543,370
SPRING COILING AND ASSEMBLING
Filed March 15, 1948 — 6 Sheets-Sheet 6

Jonathan Kludt,
Howard Parks,
Inventors.
Haynes and Koenig
Attorneys.

Patented Feb. 27, 1951

2,543,370

UNITED STATES PATENT OFFICE 2,543,370

SPRING COILING AND ASSEMBLING

Jonathan Kludt, Overland, and Howard Parks, St. Louis, Mo., assignors to Lincoln Engineering Company, St. Louis, Mo., a corporation of Missouri Application March 15, 1948, Serial No. 14,954

8 Claims. (Cl. 140—78)

This invention relates to spring coiling and assembling, and more particularly to methods of and apparatus for continuous-production coiling of springs and assembly thereof with other elements.

Among the several objects of the invention may be noted the provision of improvements in methods of and apparatus for coiling wire into springs and assembling the springs with spring-receiving parts such as the bodies of lubrication fittings; the provision of a method and an apparatus of the class described adapted for simplified, more positive and direct assembly of the springs with the fittings than heretofore accomplished; the provision in apparatus of the class described of a spring coiler which may be readily removed and replaced; the provision in apparatus of this class of an improved spring coiler, parts of which are readily accessible for adjustment and repair; and the provision of a spring coiler of simplified, economical construction, which may be readily initially adjusted to determine the characteristics of springs produced, and which accurately holds its adjustments for long periods of production. Other objects will be in part apparent and in part pointed out hereinafter.

The invention accordingly comprises the elements and combinations of elements, steps and sequence of steps, features of construction and manipulation, and arrangements of parts which will be exemplified in the structures and methods hereinafter described, and the scope of the application of which will be indicated in the following claims.

In the accompanying drawings, in which one of various possible embodiments of the invention is illustrated, Fig. 1 is a view in side elevation of the apparatus of this invention;

Fig. 7 is an enlarged view in side elevation of the spring coiler per se of the apparatus as viewed in Fig. 1, parts being broken away and shown in section;

Fig. 10 is a bottom plan view of the spring coiler of Fig. 7 showing in dotted lines a mechanism for actuating a coiling point;

Fig. 13 is a section taken on line 13—13 of Fig. 8;

Fig. 14 is an enlarged section taken on line 14—14 of Fig. 12;

Fig. 15 is a section taken on line 15—15 of Fig. 10;

Fig. 16 is an enlarged section taken on line 16—16 of Fig. 15;

Fig. 17 is a section taken on line 17—17 of Fig. 8;

Fig. 18 is an enlarged section taken on line 18—18 of Fig. 12;

Fig. 19 is a section taken on line 19—19 of Fig. 18;

Similar reference characters indicate corresponding parts throughout the several views of the drawings.

Figure 3:
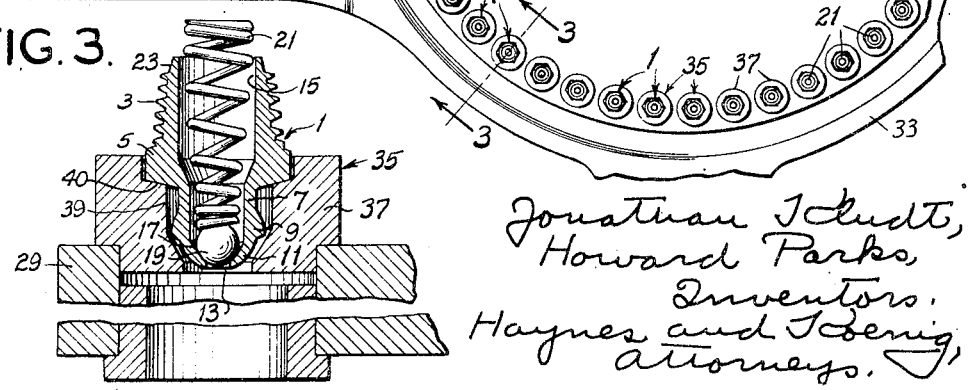
Fig. 3 is an enlarged detail section taken on line 3—3 of Fig. 2.

This invention is particularly adapted for the manufacture of lubricant-receiving fittings similar to the type shown in U. S. Patent 2,400,817. Fig. 3 herein illustrates such a fitting in an intermediate stage of manufacture which is the end result of the operations of the method and apparatus of this invention. As illustrated, the fitting at this stage comprises a hollow body or blank 1 formed to have a screw-threaded portion 3 having a hexagonal head 5 for application of a wrench, and a nipple 7 extending from the head 5. The nipple 7 has a collar 9 for cooperation with a coupler on the end of a lubricant hose, and terminates in a hemispherical head 11 having a lubricant inlet opening 13. The blank has a passage 15 therethrough from one end to the other. This passage may be reduced in diameter in nipple 7 and has a tapered valve seat portion 17 leading from inlet opening 13. A ball check valve member 19 is seated against the seat 17. In passage 15 is a generally conical and helical spring 21. The smaller end of the spring engages the ball 19. The end of the threaded portion 3 has an extension 23 adapted to be spun over after the spring has been compressed to form an internal flange or shoulder providing a seat for the larger end of the spring (see said Patent 2,400,817).

This invention relates particularly to a method of and apparatus for forming springs 21 and delivering them into place in passages 15 of the blanks 1 (after the balls 19 have been seated) in a continuous operation. It will be understood, however, that the invention is not limited in application to the production of the particular fitting illustrated, but is generally applicable for spring forming and assembling purposes.

Referring more particularly to Figs. 1–4, the apparatus of this invention is shown generally to comprise a work-holding conveyor 25 for intermittently moving blanks 1 as work pieces into position for receiving springs formed by a spring coiler 27. The conveyor is herein illustrated as a circular turntable 29 mounted on the upper end of a vertical shaft 31 (Fig. 4) journalled in the table 33 of the supporting frame of the apparatus. On the turntable adjacent its periphery is a circular series of work holders 35 for holding blanks or work pieces 1, the holders being spaced at equal angular intervals. Each holder comprises a block 37 fitted in an aperture in the turntable and having a vertical upwardly opening socket 39 adapted to receive a blank 1 in upright position with the hexagonal head 5 of the blank resting on a shoulder 40 in the socket and with the threaded portion 3 of the blank extending upward out of the socket.

Spring coiler 27 has a frame comprising a pair of spaced mechanism-supporting plates 41 and 43 connected by spacing posts 45. The coiler normally occupies the operative position shown in solid lines in Fig. 1 wherein the plates are horizontal, with plate 41 lowermost and spaced above the table 33, and with the coiler extending generally radially of the turntable 29 and having its radially inner end overhanging the turntable. The coiler may be swung upward and outward away from its operative position to the retracted position illustrated in dotted lines in Fig. 1, being pivoted for such movement by means of a pair of arms 47 extending outward from the radially outer end of the lower plate 41 and pivoted at their free ends on a horizontal shaft 49. The latter is removably mounted in a pair of blocks 51 fixed on the table 33. Swinging movement of the coiler is limited to determine its operative position by shoulders 53 (Fig. 11) on a pair of posts 55 extending vertically from table 33 adjacent the periphery of turntable 29. In the operative position of the coiler, the lower plate rests on the shoulders and is confined laterally by the posts.

Fixed in the overhanging portion of the lower plate 41 of the spring coiler is a cylindrical tool holder 57 (Figs. 10, 15 and 16). The lower end of the tool holder extends downward out of the plate. The tool holder has a vertical cylindrical aperture 59 therethrough receiving a collet 61. The lower end of the collet is split and has a tapered head 63 fitting in the countersunk lower end 65 of aperture 59. Head 63 extends somewhat below the lower end of the holder. The upper end of collet 61 extends out of the tool holder and has a nut 67 threaded thereon. Clamped in the split lower end of the collet is a flat-sided arbor pin 69. This pin projects downward out of the collet and its projecting end forms an arbor around which wire W is coiled to form springs. The pin 69 may be readily removed by backing off nut 67 to relieve the clamping action on the pin within the split tapered head 63 of the collet and withdrawing it, and a new pin readily inserted when necessary. The spring coiler is so located when in operative position that the arbor 69 is at substantially the same radius with respect to turntable 29 as the centers of the sockets of the work holders.

Figure 20:
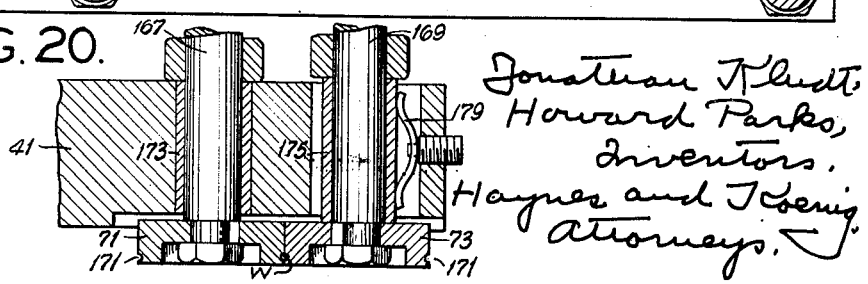
Fig. 20 is a section taken on line 20—20 of Fig. 10.
Figure 11:
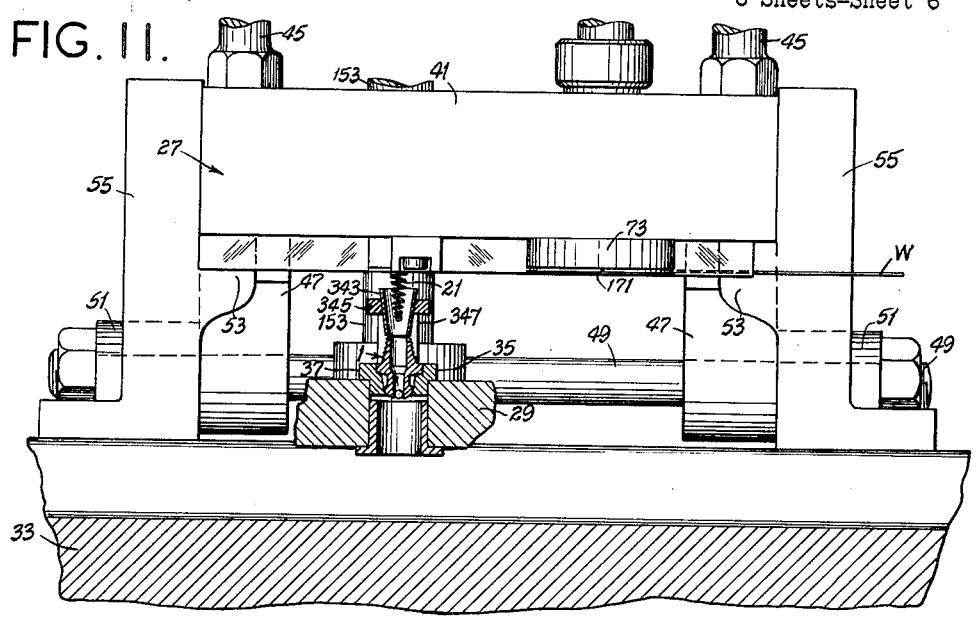
Fig. 11 is an enlarged section taken substantially on line 11—11 of Fig. 1.

Generally, the spring coiler 27 comprises a pair of wire feeding rolls 71 and 73 (Figs. 10 and 20) for feeding wire W from a continuous supply (not shown) past the arbor 69 against a coiling point 75, which causes the wire to coil around the arbor in convolutions having a diameter determined by the distance from the coiling point to the arbor. As the convolutions are formed, they are caused to become axially spaced from one another by a pitch tool 77. This tool is arranged to cause the convolutions to spin out below the arbor as they are formed so that when a spring is fully formed it extends vertically, depending from the remainder of the wire below the arbor (Fig. 11). When a spring has been fully coiled, a wire cutter 79 severs the spring from the remainder of the wire and the spring drops off by gravity.

Figure 5:
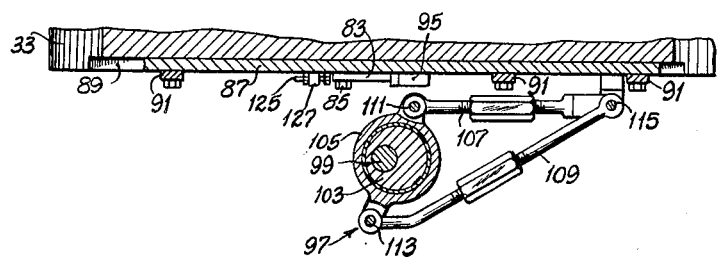
Fig. 5 is a detail section taken on line 5—5 of Fig. 4.
Figure 6:
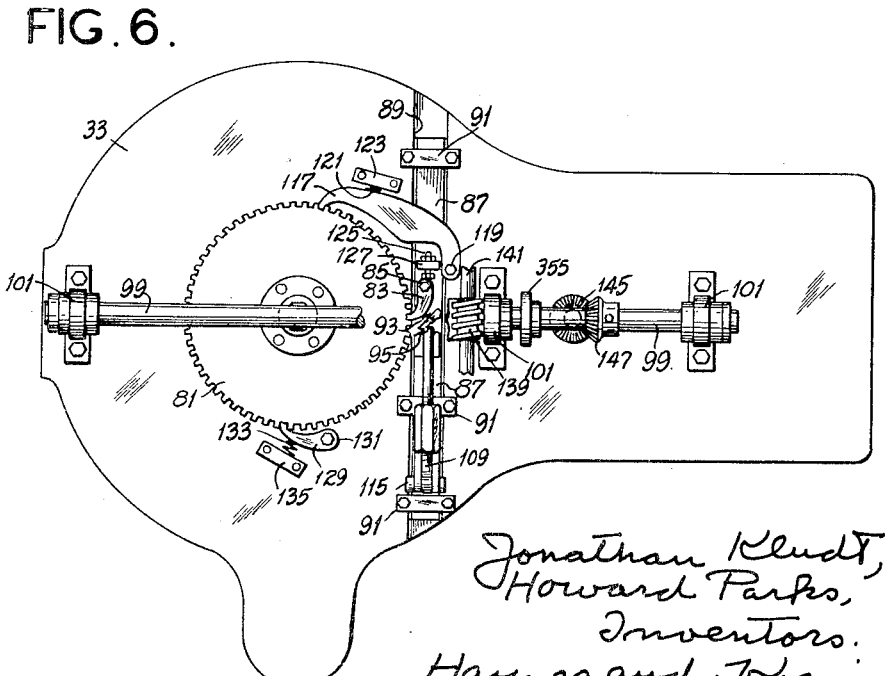
Fig. 6 is a bottom plan view of Fig. 4, parts being broken away.

The apparatus includes suitable indexing mechanism, illustrated in Figs. 4–6, for indexing the turntable 29 around in counterclockwise direction as viewed from above intermittently and successively to present blanks 1 in work holders 35 below and substantially centered with the coiling arbor 69. As illustrated, the turntable shaft 31 has an indexing ratchet disc 81 fixed thereon below the table 33. The periphery of this disc has a number of ratchet teeth and notches corresponding in number and angular spacing to the work holders 35 on the turntable. The disc is adapted intermittently to be indexed through an arcuate interval of one tooth by means of a reciprocating pawl 83. The latter is pivoted at 85 on the bottom of a slide 87 which is reciprocable in a groove 89 in the bottom of table 33. The slide is retained in the groove 89 by straps 91 secured to the table. Pawl 83 is biased toward the ratchet disc 81 by a spring 93 which reacts from a spring seat 95 fixed on the bottom of the slide.

The slide 87 is constantly reciprocated by means of an eccentric mechanism 97 (Fig. 5) from a continuously driven main drive shaft 99 for the apparatus. Drive shaft 99 is journalled in bearings 101 under the table 33 and extends diametrically with respect to turntable 29 and ratchet disc 81. Mechanism 97 includes an eccentric disc 103 fixed on shaft 99 and rotary within a circular strap 105. The latter is linked to the slide by a pair of adjustable links 107 and 109, pivoted to the strap at 111 and 113, respectively, and both pivoted to the slide at 115. The throw of the eccentric disc 103 is such as to cause reciprocation of slide 87 and pawl 83 through a distance for indexing the ratchet disc 81 one tooth upon each revolution of the shaft 99 and each reciprocation of the slide. Indexing of the disc occurs upon forward movement of the slide 87 and pawl 83, which is toward the bottom of the drawing as viewed in Fig. 6.

A check pawl 117 is pivoted at 119 on the bottom of table 33 and is engageable in a notch in the ratchet disc 81 to prevent rotation of the disc and turntable 29 in forward direction except during the indexing operation. The pawl 117 is biased toward the ratchet disc by a spring 121 reacting from a spring seat 123 fixed to the bottom of the table 33. On the bottom of the slide 87 is a check pawl actuator comprising a screw 125 adjustably threaded in a block 127. Screw 125 is adjusted so that its end engages check pawl 117 as slide 87 moves rearward, lifting it away from the ratchet disc 81 to permit pawl 83 to index the ratchet disc forward when the slide moves forward. A third pawl 129 is pivoted at 131 on the bottom of the table 33 and engages in a notch of the ratchet disc to prevent reverse rotation of the disc and turntable 29.

Pawl 129 is biased toward the disc by a spring 133 reacting from a spring seat 135 fixed to the bottom of the table 33.

The main drive shaft has a worm gear 137 fixed thereon. Meshing with the worm gear is a worm 139 fixed on a shaft 141 which is continuously driven by a motor (not shown). Upon each revolution of the main drive shaft 141, the slide 87 is reciprocated through a full stroke to index the ratchet disc 81 and turntable 29 through one step successively and intermittently to position work holders 35 under the arbor 69 of the spring coiler 27.

A vertical shaft 143 is journalled in table 33 under the spring coiler 27 with its axis intersecting the axis of main drive shaft 99 outward of the periphery of turntable 29. A bevel gear 145 on the lower end of shaft 143 meshes with a bevel gear 147 on shaft 99 whereby shaft 143 is continuously driven. On the upper end of shaft 143 above table 33 is fixed a clutch or coupling member 149 having an off-center transverse slot 151 in its upper face. Journalled in the plates 41 and 43 of the spring coiler 27 is a spring coiler drive and cam shaft 153 axially aligned with shaft 143 when the spring coiler is in its operative position. Fixed on the lower end of shaft 153 is a crown clutch or coupling member 155 having an off-center key 157 engageable in the slot 151 in member 149. Members 149 and 155 constitute a clutch for coupling shaft 143 to shaft 153 when the spring coiler is in operative position. When the spring coiler is swung away to its retracted position, the members 149 and 155 disengage and the drive for shaft 153 is discontinued to stop the operation of the spring coiler.

The shaft 153 extends through the upper plate 43 of the spring coiler 27 (Figs. 8 and 13), and has a crank disc 159 on its upper end. Crank disc 159 is an element of an intermittent, unidirectional rack and pinion mechanism, generally designated 160, for intermittently rotating the wire feed rolls 71 and 73 to feed forward a length of wire W to be coiled into a spring 21. Fixed on shaft 153 between plates 41 and 43 are three cams 161, 163 and 165 (Figs. 7 and 9) for actuating the coiling point 75, the pitch tool 77 and the wire cutter 79, respectively.

Figure 8:
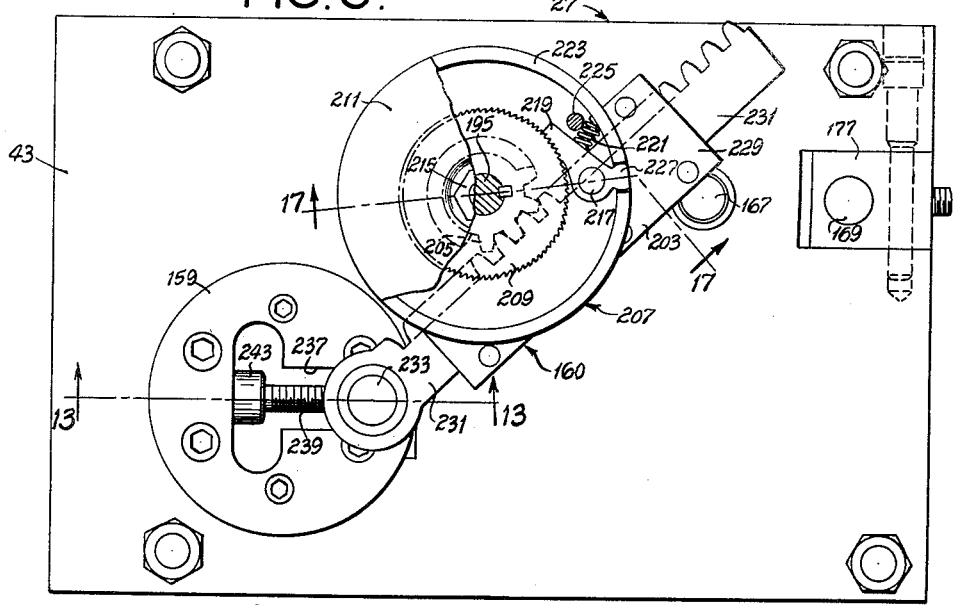
Fig. 8 is a plan view of the spring coiler of Fig. 7, parts being broken away.

The wire feed rolls 71 and 73 are fixed on the lower ends of vertical shafts 167 and 169, respectively, below the lower plate 41. The pass plane of the rolls extends substantially tangential to the coiling arbor 69. Each roll has a peripheral groove 171 for confining the wire against lateral movement. The shaft 167 for roll 71 is journalled in fixed bearings 173 in the plates 41 and 43. The shaft 169 for roll 73 is journalled in a sliding bearing 175 in plate 41 and in a rocking bearing 177 in plate 43 (Fig. 8). Bearing 175 is biased toward shaft 167 by a leaf spring 179 (Fig. 20) so as to bias feed roll 73 toward feed roll 71 to apply pressure on the wire. The wire is guided to enter the grooves in the feed rolls by a wire guide 181 fixed on lower plate 41 (Fig. 10). Wire emerging from between the feed rolls is guided by a wire guide 183 fixed on plate 41 to travel past one side of the arbor 69 and into engagement with the end of coiling point 75. Buckling of the length of wire extending from the exit of guide 183 to the coiling point is prevented by a wire guide 185 mounted on lower plate 41 for adjustment toward and away from the arbor 69 in a direction normal to the path of the wire. Guide 185 is mounted for such adjustment by means of set screws 187 extending through an elongate slot 189 in the guide and threaded in plate 41.

The feed roll shafts 167 and 169 are coupled by gears 191 and 193 (Fig. 9) adjacent the inside face of upper plate 43 and are intermittently driven to advance a length of wire W toward the arbor 69 and coiling point 75 by means of the rack and pinion mechanism 160. This mechanism includes a countershaft 195 (Figs. 8 and 17) journalled at 197 and 199 in lower plate 41 and upper plate 43, respectively. The countershaft 195 has a gear 201 fixed thereon and meshing with gear 191 on feed roll shaft 167. It extends above the upper plate 43 through a rack and pinion housing 203. A pinion 205 (Figs. 8 and 17) is rotary on the countershaft 195 within housing 203. The pinion is keyed to a ratchet housing 207, also rotary on the countershaft, and which encloses a ratchet 209 keyed on the upper end of the countershaft. Ratchet 209 is an element of a one-way clutch mechanism providing for intermittent and unidirectional rotation of the countershaft.

The ratchet housing 207 comprises a cup-shaped member 210 which surrounds the countershaft 195 above the rack and pinion housing 203. A cover 211 for housing 207 is held in place by a spring 213 reacting from a nut 215 threaded on the end of the countershaft. A pivot pin 217 extends from the cover 211 into the housing 207. Pivoted on this pin is a pawl 219 biased toward the ratchet 209 by a spring 221 reacting from the rim 223 of the housing 207 and retained in place by a pin 225 extending from cover 211. The pawl 219 has a tail 227 which fits in a notch in rim 223.

The rack and pinion housing 203 has a tangential guide 229 for a rack 231 which meshes at one end with pinion 205 within the housing. The rack extends out of the housing and is pivoted at its other end to a crank pin 233 radially adjustable on the crank disc 159. As illustrated in Fig. 13, crank pin 233 extends upward from a nut 235 mounted for non-rotary sliding movement in a radial slot 237 in the crank disc. An adjusting screw 239 extends radially through the wall of the crank disc into the slot and is threaded in the nut. The screw is rotary in the crank disc and is confined against axial movement by its head 241 and a collar 243 pinned on the screw. The arrangement is such that the radius of the crank pin 233 may be varied to vary the throw of the rack 231 by turning screw 239 radially to move the nut 235.

Shaft 153 and crank disc 159 rotate continuously throughout the operation of the apparatus. This causes rack 231 to oscillate and reciprocate continuously and alternately to rotate pinion 205 in opposite directions. The rack and pinion housing 203 is rotary, thus permitting oscillation of the rack. Upon rotation of pinion 205 in counterclockwise direction as viewed in Fig. 8 during the forward portion of the stroke of rack 231, the housing 207 rotates in counterclockwise direction and its rim 223 rotates through a small arc relative to its cover 211 to act against the tail 227 of pawl 219 thereby to pivot the pawl into engagement with ratchet 209. The pawl thereupon drives the ratchet 209 and countershaft 195 in counterclockwise direction. Rotation of the countershaft is transmitted through gears 201, 191 and 193 to drive the feed roll shafts 167 and 169 and feed rolls 71 and 73 in wire-feeding direction. Upon rotation of pinion 205 in clockwise direction during the return portion of the stroke of rack 231, the housing 297 rotates in clockwise direction and its rim 223 rotates through a small arc relative to cover 211 to act against the tail of pawl 219 thereby to pivot the pawl out of engagement with ratchet 209 against the bias of spring 221. Thus, the countershaft 195 is rotated intermittently and unidirectionally to drive the feed rolls in wire-feeding direction. The phasing of the feed roll drive and the indexing drive for the turntable 29 is such that the feed rolls are driven during the interval in which the turntable is being indexed through one step.

Figure 21:
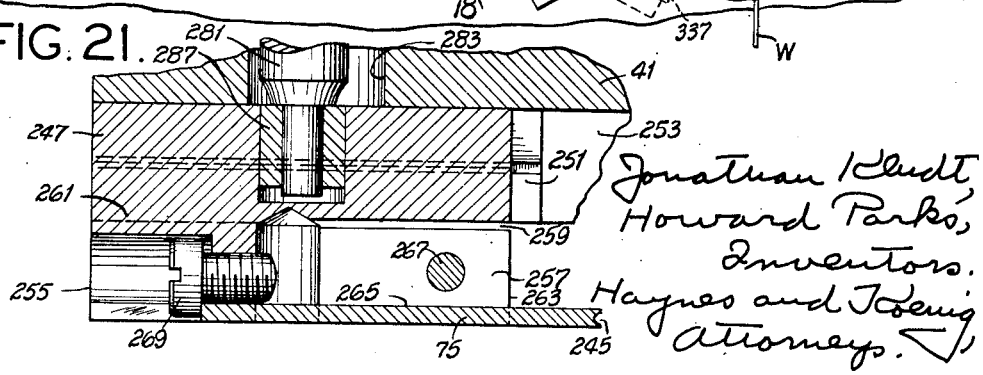
Fig. 21 is a section taken on line 21—21 of Fig. 12.

The coiling point 75 comprises a flat rigid strip having a grooved forward end face 245. Wire driven forward by the feed rolls 71 and 73 is forced against the end face 245 within its groove and thus caused to bend into a coil the diameter of which is determined by the distance from the end face of the coiling point to the arbor 69. The coiling point is adjustably fixed in a holder 247 (Figs. 7, 10, 12, 14 and 21) mounted for sliding movement toward and away from the arbor with the coiling point located to move in the pass plane of the feed rolls. Holder 247 comprises a block having its side margins tapered as indicated at 249 and slidable in V-grooved ways 251 fixed within a recess 253 in the bottom of the lower plate 41 of the spring coiler 27. The block has a projecting portion 255 which is slit as indicated at 257 and 259 to form a fixed clamp member 261 and a resiliently movable clamp jaw 263. Member 261 and jaw 263 are grooved as indicated at 265 to receive the coiling point 75. A clamping screw 267 (Fig. 14) extends through the clamp jaw 263 and is threaded in the member 261 to draw these elements together to clamp the coiling point in place. An adjusting screw 269 extends through the rear of projection 255 with its head in engagement with the rear end of the coiling point 75 for making accurate initial adjustments of the position of the latter (Fig. 21).

Figure 9:
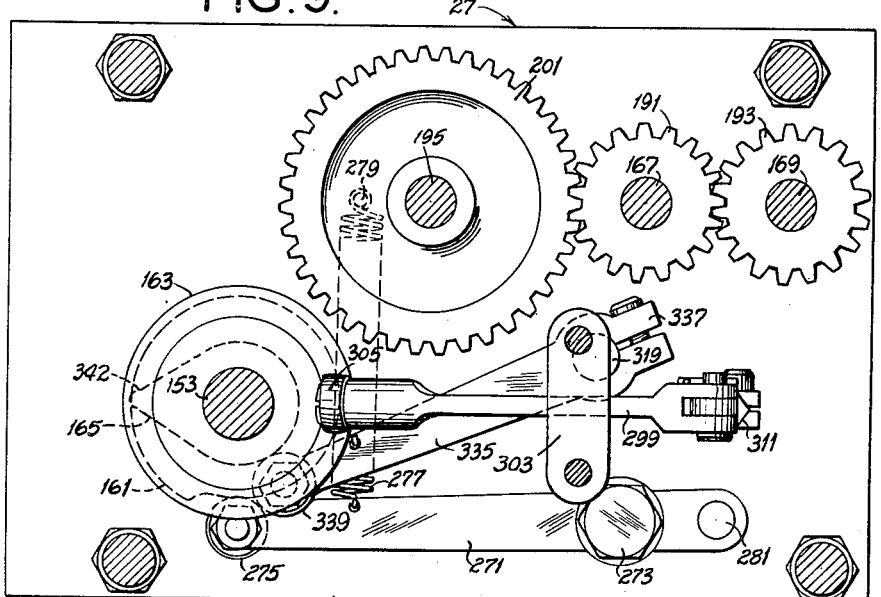
Fig. 9 is a section taken on line 9—9 of Fig. 7.

The holder 247 carrying coiling point 75 is adapted automatically to be moved toward and away from the arbor by the coiling point cam 161 through a linkage including a cam follower lever 271 (Figs. 7, 9 and 10). Cam 161 is fixed on cam shaft 153 adjacent lower plate 41. Follower lever 271 is pivoted intermediate its ends on a pin 273 extending vertically upward from lower plate 41. At one end it has a cam follower roller 275 engaging the periphery of the cam, being biased against the cam by a spring 277 connected between the lever and a spring post 279 fixed in lower plate 41. At its other end it has a pin 281 which extends through an aperture 283 in lower plate 41 into a transverse groove 285 in the coiling point holder. Journalled on the end of pin 281 within groove 285 is a rectangular bearing member 287 having a sliding fit in the groove.

Shaft 153 is continuously driven and coiling point cam 161 consequently rotates continuously. As the cam rotates, it causes follower lever 271 to rock about pivot pin 273. As the lever rocks counterclockwise as viewed in Fig. 10, it moves the coiling point 75 away from arbor 69. As it rocks clockwise, it moves the coiling point toward the arbor. The periphery of the cam 161 is so shaped and the cam is so phased with respect to the operation of the feed rolls 71 and 73 as to cause the coiling point 75 gradually to move away from an initial position (Fig. 10) closest to the arbor during the cycle of operation of the feed rolls, then to cause the coiling point to return to its initial position ready for forming the next spring. In the initial position of the coiling point, its forward end 245 is spaced from the arbor a distance corresponding to the diameter of the smallest coil of conical spring 21. As it moves away from the arbor, the diameter of the successive coils of the spring into which the wire is bent gradually increases, thus imparting the conical shape to the spring. This occurs during the interval in which shaft 153 and cam 161 rotate through a half revolution and in which rack 231 is making a forward stroke to drive the wire feed rolls 71 and 73. The coiling point is returned to initial position after the completion of the spring.

The pitch tool 77 comprises a rod 291 (Figs. 15 and 16) which is mounted for axial sliding movement in bore 293 in tool holder 57. At its lower end below the tool holder it has a lug 295 at right angles to its axis extending toward the arbor and spaced from the end of the wire guide 135. The outer or lower face of the lug adjacent the arbor is rounded or beveled, as indicated at 297, to provide a cam or wedge surface for deflecting the wire after any coil or convolution of the spring has been started to cause it to become axially spaced from the next successively formed coil or convolution. This deflecting surface 297 is shaped to cause the convolutions of the spring to spin out downward below the arbor. The pitch of the convolutions of the spring is determined by the axial or vertical spacing of the groove in the forward end face 245 of the coiling point 75 and the deflecting surface 297. To increase the pitch of the convolutions, the deflecting surface is moved further below the groove, and vice versa.

As herein illustrated, the first few convolutions of a spring 21 at its small end and the last few convolutions at its large end are to be closely spaced, the intermediate convolutions being widely spaced. To provide for forming such a spring, the pitch tool 77 is automatically moved during the spring-forming operation to vary the pitch of the convolutions by the pitch tool cam 163 through a linkage including a cam follower lever 299 (Figs. 7 and 9). Cam 163, a cylindrical cam, is fixed on cam shaft 153 intermediate plates 41 and 43. Lever 299 is pivoted intermediate its ends for rocking movement in a vertical plane on a horizontal pin 301 mounted in bracket 303 fixed on the inside face of the upper plate 43. At one end of the lever is a follower roller 305, biased into engagement with cam 163 by a spring 307 connected between the lever and a hook 309 fixed in lower plate 41. The other end of the lever 299 is linked to the pitch tool rod 291 by an adjustable coupling link 311.

Cam 163 is continuously driven. As it rotates it causes follower lever 299 to rock about pivot pin 301. When lever 299 rocks clockwise as viewed in Fig. 7, it drives the pitch tool downward. When it rocks counterclockwise, it drives the pitch tool upward. The cam 163 is so shaped and phased with respect to the operation of the wire feed rolls 71 and 73 as to maintain the pitch tool in an initial raised position, with deflecting surface 297 close to the groove in the end of the coiling point, during the formation of the first few closely-spaced convolutions of the spring 21, then to move the pitch tool downward to increase the pitch of the convolutions during the formation of the intermediate widely-spaced convolutions, then to return the pitch tool upward to its initial position for forming the last few closely-spaced convolutions of the spring. All this occurs during the interval in which shaft 153 and cam 161 rotate through a half revolution and in which rack 231 is making a forward stroke to drive the wire feed rolls 71 and 73. During the remainder of a revolution, the cam 163 and spring 307 maintain the pitch tool in its initial position, ready for forming the next spring.

The wire cutter 79 comprises a blade 313 having a wire-shearing edge 315. The blade is adjustably fixed in a blade holder 317 fixed on the lower end of a rock shaft 319 journalled in a bearing 321 in the lower plate 41. Blade holder 317 comprises a block having a slit 323 forming a pair of resilient clamping jaws 325 and 327 (Fig. 19) at its end adjacent the arbor 69. The jaws are grooved as indicated at 329 to receive the blade 313 with the end of the blade projecting beyond the jaws. A clamping screw 331 extends through jaw 325 and is threaded in jaw 327 to draw the jaws together to clamp the blade in place. An adjusting screw 333 (Fig. 18) extends through the rear of the blade holder with its head in engagement with the rear end of the blade for making accurate initial adjustments of the position of the latter. The blade 313 is longitudinally adjusted in the blade holder to position its shearing edge 315 for shearwise cooperation with the flat side of the arbor 69 when the blade holder is rocked clockwise from its retracted position of Fig. 10, thereby to cut wire W at the arbor.

The blade holder 317 carrying blade 313 is adapted automatically to be rocked toward the arbor to cut wire W after a spring has been completely coiled, by the cam 165 through a linkage comprising a cam follower lever 335. Cam 165 is fixed on cam shaft 153 between cams 161 and 163. Follower lever 335 is fixed at one end 337 to the rock shaft 319 and has a cam follower 339 at its other end engaging the periphery of the cam. The lever is biased toward the cam by a spring 341 connected between the lever and the spring post 279.

Figure 12:
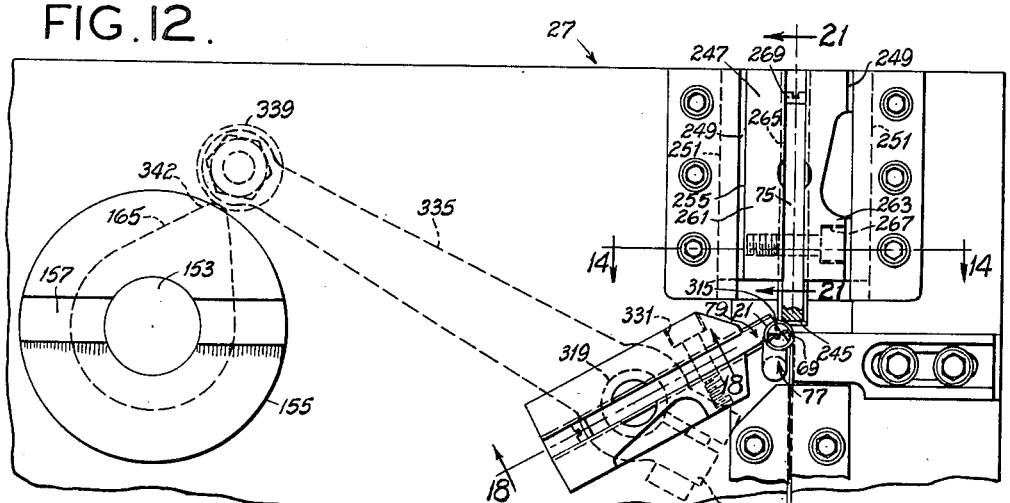
Fig. 12 is an enlarged fragmentary bottom plan view of the spring coiler (similar to Fig. 10) but illustrating certain parts in different positions and showing in dotted lines mechanism for actuating a wire cutter.

Cam 165 rotates continuously. It has a lobe 342 which, once every revolution, rocks lever 335 to rock the blade holder 317 and blade 313 toward the arbor to cut wire W at the arbor (Fig. 12). This is timed to occur at the completion of the wire-feeding and spring-forming cycle, so that a completed spring 21 is severed from the remainder of the wire to drop by gravity. After the wire has been cut, the blade holder and blade are rocked back to their retracted position of Fig. 10.

Figure 1:
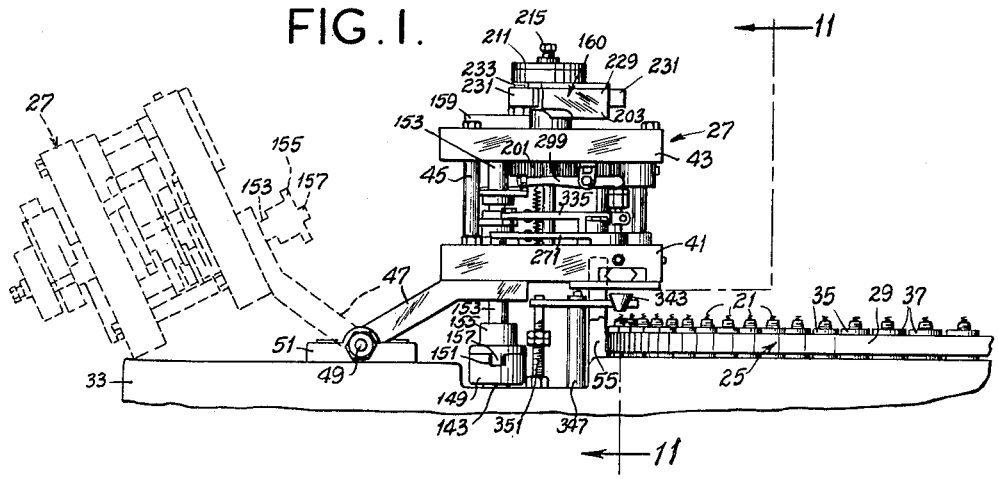
Figure 2:
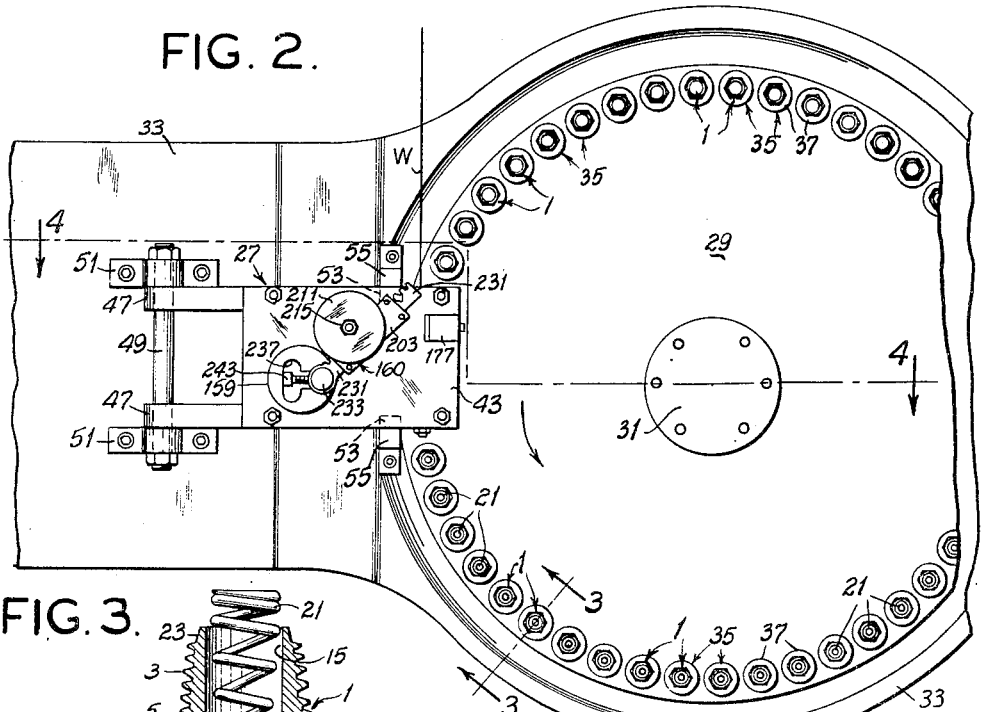
Fig. 2 is a plan view of Fig. 1.
Figure 4:
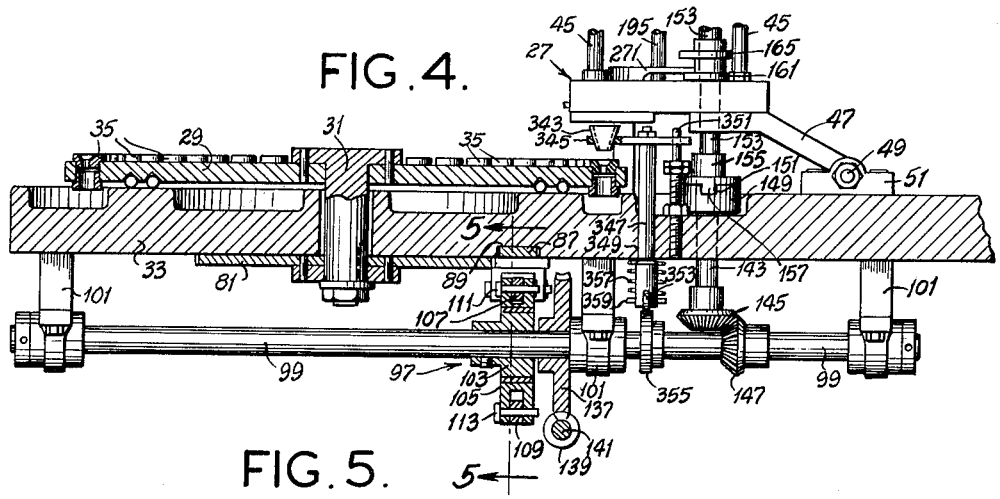
Fig. 4 is a section taken substantially on line 4—4 of Fig. 2 on a reduced scale.

A spring 21, severed from the remainder of the wire by the cutter, drops into a short funnel-shaped spring guide 343 (Figs. 1, 4 and 11). This guide is mounted in one end of a horizontal guide plate 345 fixed on the upper end of a vertical shaft 347. The shaft is vertically reciprocable in a bearing 349 in the table 33 adjacent the periphery of the turntable 29 with its axis intersecting the axis of the main drive shaft 99. The guide 343 is located with its axis intersecting the circular center line of the series of work holders 35. A stud 351 extends upward from table 33 through an aperture in the outer end of guide plate 345 to prevent rotation of the shaft 347 and to maintain the funnel guide in alignment. Shaft 347 has a cam follower roller 353 at its lower end engaging a cam 355 fixed on the main drive shaft 99. The shaft 347 is biased downward by a spring 357 reacting from the bottom of table 33 against a pin 359 which forms the shaft for roller 353.

Cam 355 rotates continuously with shaft 99. Its development and phasing is such as to cause the guide 343 to be lowered into engagement with the upper end of a blank 1 in a work holder 35 after turntable 29 has been indexed through one step to position the work holder under the arbor 69 of the spring coiler (Fig. 11). While the work holder and guide are in this position, the spring 21, severed from the remainder of the wire, drops through the guide into the passage 15 in the blank 1 in the work holder. The spring 21 is uncompressed and its upper end extends out of the blank 1. Before the turntable 29 starts to rotate through the next indexing step, cam 355 raises the guide 343 above the upper end of the spring 21 in the blank 1 so that the spring does not interfere with rotation of the turntable.

Operation is as follows:

With the spring coiler 27 in its operative position as illustrated in Fig. 1, and with main drive shaft 99 continuously rotating, the spring coiler cam and drive shaft 153 is continuously driven through bevel gears 147 and 145, vertical shaft 143, and clutch members 149 and 155. The turntable 29 is intermittently rotated in counter-clockwise direction as viewed in Fig. 2 by the ratcheting index drive including eccentric mechanism 97, slide 87 and pawl 83. The step-by-step rotation of the turntable successively positions work holders 35 under the arbor 69 of the spring coiler 27. Blanks 1 are placed in the work holders 35 before the latter travel under the spring coiler. After a blank has been placed in the socket 39 of a work holder with the spring-receiving passage 15 of the blank opening upward, a ball 19 is dropped into the passage and seated against the tapered ball seat 17.

During the interval in which the turntable 29 is being indexed through one step to bring a blank 1 into position under the arbor 69 of the spring coiler, the coiler drive shaft 153, acting through the crank disc 159 and crank pin 233, drives the rack 231 through the forward portion of its stroke. This rotates the pinion 205 in the direction to cause rotation of ratchet 209, countershaft 195, gears 201, 191 and 193, and feed roll shafts 167 and 169 to drive the wire feed rolls 71 and 73 in wire-feeding direction. The feed rolls 71 and 73 drive a length of wire forward past arbor 69 against the grooved forward end 245 of coiling point 75 to cause the wire to coil around the arbor to form the convolutions of a spring.

At the start of the spring-coiling operation, which is initiated as soon as the feed rolls 71 and 73 start to feed the wire, the coiling point 75 is in its initial position of Fig. 10 closest to arbor 69, and the camming surface 297 of pitch tool 77 is in its initial raised postion for imparting minimum pitch to the convolutions of the spring to be formed. Consequently, the first few convolutions of the spring as formed are of small diameter and close to one another. As the spring-forming cycle progresses, the coiling point 75 gradually recedes from the arbor to impart a gradual increase in diameter to the successively formed convolutions of the spring. Fig. 12 illustrates the coiling point 75 in its most remote position for forming the largest-diameter coil at the upper end of the spring. Also, after the first few closely spaced convolutions of the spring have been completed, the pitch tool 77 is moved downward to increase the pitch of the convolutions. As above described, movement of the coiling point is determined by cam 161 and movement of the pitch tool is determined by cam 163. Thus, the spring is formed to be of conical helical type with closely-spaced convolutions at its small end. As the spring is formed, it extends downward from the remainder of the wire below the arbor 69, with its axis substantially vertical and its small end lowermost.

Just before the conclusion of the spring-forming cycle, the pitch tool 77 is retracted to its initial raised position to form the last few convolutions of the spring at its large end in closely spaced relation. At the conclusion of the cycle, cam 165 operates the wire cutter 79, causing the cutting blade 313 to move to the position illustrated in Fig. 12 to shear the wire at the upper end of the spring between the shearing edge 315 of the blade and the flat side of the arbor 69, and then returns the cutter to its retracted position of Fig. 10. Cam 161 returns the coiling point 75 to its initial position. Thus, the coiling point, pitch tool and cutter are returned to their initial positions awaiting the next spring-forming cycle.

The spring 21 is completed and severed from the remainder of the wire just after the turntable 29 has completed an indexing step and has carried a blank 1 into spring-receiving position under the arbor 69. At this time, the funnel guide 343 is in lowered position in engagement with the upper end of the blank (Fig. 11). The spring, cut off from the remainder of the wire, falls into the funnel guide, small end down, and drops out of the guide into the passage 15 in the blank. Movement of the spring after severing is along a straight path of minimum length. The lower end of the spring engages the ball 19 in the blank and its upper end extends above the blank a short distance into the funnel guide.

Cam 355 thereupon drives shaft 347 and funnel guide 343 upward to raise the latter above the upper end of the spring. The turntable 29 is then indexed through another step to position the blank 1 in the next work holder 35 under the arbor 69 of the spring coiler. While the turntable is being indexed, another spring 21 is formed in the manner above described. It will be noted that when a spring has been severed from the remainder of the wire, the fresh end of the wire is half coiled around the arbor, thus facilitating the coiling of the next spring. After the turntable has completed its indexing step, the spring is cut off and drops into the blank as above described. The indexing and spring forming operations are repeated in a continuous process for utmost rapidity in assembling springs 21 with the blanks 1. After the blanks 1 having springs 21 therein are indexed out from under the spring coiler, the springs are compressed and the extension 23 of the threaded portion 3 of the blank is spun over to hold the spring compressed against the ball 19 within the blank. In practice, this is accomplished by means of an automatic metal-spinning machine tool, not described herein as it does not form a part of the invention. This completes the lubricant-receiving fittings and the completed fittings are removed from sockets 39 to make way for empty blanks 1.

Thus, the invention provides for coiling of springs and their assembly with spring-receiving parts such as the bodies of lubricant-receiving fittings 1 in a most efficient, positive and direct manner. The method of forming the spring in vertical position and then severing it from the remainder of the wire whereby the spring drops by gravity a short distance and directly into the part to receive it is highly advantageous as it eliminates any necessity for manual or mechanical operations for inserting the spring and permits a high production rate. Assembly is accomplished by the simple act of severing the spring from the remainder of the wire from which the spring is formed.

The spring coiler 27 may be readily swung back to the retracted position illustrated in dotted lines in Fig. 1 to obtain access to the parts such as the arbor 69, coiling point 75, cutter 79, guide 185 etc. for adjustment and repair when necessary. When the coiler is swung back, the drive therefor is automatically discontinued by the disengagement of clutch members 149 and 155 so that there is no danger of inadvertent operation of the coiler while it is being adjusted or repaired.

The spring coiler 27 is of such simplified construction that it is economically feasible to have on hand a number of coilers having cams of different shapes for producing springs of different characteristics for a variety of lubricant-receiving fittings. It is then a simple matter to change over from production of one type of spring to another by removing the pivot shaft 49 for the instant coiler from blocks 51, removing the entire coiler, and replacing it with another coiler having such cams and so adjusted as to produce the type of spring desired. The construction of the coiler is such that it retains its adjustments for long periods of production despite vibration of the apparatus and is therefore adapted for high quantity and quality production.

In view of the above, it will be seen that the several objects of the invention are achieved and other advantageous results attained.

As many changes could be made in the above constructions and methods without departing from the scope of the invention, it is intended that all matter contained in the above description or shown in the accompanying drawings shall be interpreted as illustrative and not in a limiting sense.

We claim:

1. The method of forming helical springs and assembling them with members having a passage therein for axially receiving a spring, comprising the steps of coiling the end portion of a continuous length of wire into a helical spring with the axis of the spring substantially vertical, relatively moving the spring and a spring-receiving member to position the member with its passage opening upward substantially directly and immediately under the formed spring, and cutting the wire to sever the spring from the remainder of the wire, whereupon the spring drops directly by gravity into the passage.

2. In the manufacture of lubricant-receiving fittings of the type comprising a body having a passage therein axially receiving a helical spring, the steps of coiling the end portion of a continuous length of wire into a helical spring extending downward from the remainder of the wire with the axis of the spring substantially vertical, moving a fitting body into position with its spring-receiving passage substantially directly and immediately under the spring and opening upward, and cutting the wire to sever the spring from the remainder of the wire, whereupon the spring drops directly by gravity into the passage in assembled relation with the fitting body.

3. In the manufacture of lubricant-receiving fittings of the type comprising a body having a lubricant passage therein axially receiving a conical helical spring with the small end of the spring engaging a ball check valve at the end of the passage, comprising the steps of coiling the end portion of a continuous length of wire into a conical helical spring extending downward from the remainder of the wire with the axis of the spring substantially vertical and its small end lowermost, moving a fitting body into position with its spring-receiving passage substantially directly and immediately under the spring and opening upward, after a ball has been placed in the passage, and cutting the wire to sever the spring from the remainder of the wire, whereupon the spring drops directly by gravity small end first into the passage.

4. In the manufacture of lubricant-receiving fittings of the type comprising a body having a lubricant passage therein axially receiving a conical helical spring with the small end of the spring engaging a ball check valve at the end of the passage, the steps of intermittently coiling the end portion of a continuous length of wire into conical helical springs, each spring as coiled extending downward from the remainder of the wire with the axis of the spring substantially vertical and its small end lowermost, moving a fitting body while a spring is being coiled into position with its spring-receivng passage substantially directly and immediately under the spring and opening upward, a ball having been inserted in the passage of the body prior to moving it to said position, and severing each spring from the remainder of the wire whereupon it drops directly by gravity small end first into the passage.

5. Spring forming and assembling apparatus comprising a support, a spring coiler adapted to coil the end portion of a continuous length of wire into a helical spring and having a wire cutter for severing the spring from the remainder of the wire, said coiler being mounted on said support for movement between an operative position wherein it is adapted to coil a spring with the spring extending vertically downward below the bottom of the coiler and a retracted position wherein the bottom of the coiler is readily accessible, and a work conveyor having a series of work holders thereon mounted on the support for movement successively to position work pieces immediately under a spring formed by the coiler in the operative position of the latter.

6. Spring forming and assembling apparatus comprising a support, a spring coiler adapted to coil the end portion of a continuous length of wire into a helical spring and having a wire cutter for severing the spring from the remainder of the wire, said coiler being pivoted on said support for movement between an operative position wherein it is adapted to coil a spring with the spring extending vertically downward below the bottom of the coiler and a retracted position wherein the bottom of the coiler is readily accessible, a work conveyor rotary on a vertical axis on the support and having a horizontal circular series of work holders thereon movable successively to position work pieces in the holders immediately under a spring formed by the coiler in the operative position of the latter, and a drive for the spring coiler including a coupling which disengages when the coiler is swung from operative to retracted position.

7. Spring forming and assembling apparatus comprising a spring coiler having a frame, an arbor projecting vertically downward from the frame, a coiling point adjustable on the frame adjacent the arbor, feed rolls on the frame for feeding wire past the arbor against the coiling point to coil the wire around the arbor, a pitch tool adjustable on the frame adjacent the arbor for deflecting each coil of the wire downward to form a helical spring extending vertically downward, a wire cutter on the frame movable from a retracted position to sever wire against the arbor, a continuously driven coiler drive shaft journalled in the frame, cam-operated mechanisms including cams on the shaft for actuating the coiling point, pitch tool and cutter, a drive actuated by said shaft for intermittently rotating the feed rolls in direction to feed wire against the coiling point, a turntable having a circular series of upwardly opening work-holding sockets mounted for rotation about a substantially vertical axis so as to move the sockets in a substantially horizontal path, the coiler frame being mounted above the turntable with the arbor substantially directly and immediately above the path of the sockets, indexing mechanism for intermittently rotating the turntable through intervals corresponding to the angular spacing of the sockets successively to position the sockets under the arbor, the drive for the feed rolls being correlated with the indexing mechanism to feed a length of wire for springforming purposes during an indexing operation, the cams for the coiling point and pitch tool being phased automatically to adjust the coiling point and pitch tool as a spring is formed to control the diameter and pitch of successive coils of the wire, and the cam for the cutter being phased to actuate the cutter to sever the wire after a spring has been completed and after the completion of an indexing operation of the turntable.

8. Spring forming and assembling apparatus as set forth in claim 7 wherein the spring coiler frame is pivoted for swinging movement about a horizontal axis outward of the turntable, and the apparatus includes a continuously driven main drive shaft for actuating the indexing mechanism and driving the coiler drive shaft, the drive for the coiler drive shaft including a coupling which disengages when the frame is swung away from the turntable.

JONATHAN KLUDT.
HOWARD PARKS.

REFERENCES CITED

The following references are of record in the file of this patent:

UNITED STATES PATENTS

| Number | Name | Date |
|---|---|---|
| 537,472 | Miller | Apr. 16, 1895 |
| 1,083,501 | Lewis | Jan. 6, 1914 |
| 1,090,401 | Lea | Mar. 17, 1914 |
| 1,266,070 | Sleeper | May 14, 1918 |
| 1,341,477 | Marx | May 25, 1920 |
| 1,370,006 | Cook | Mar. 1, 1921 |
| 1,555,067 | Metcalf | Sept. 29, 1925 |
| 1,778,967 | Tessmer | Oct. 21, 1930 |
| 1,803,402 | Napier | May 5, 1931 |
| 1,828,413 | Holmes | Oct. 30, 1931 |
| 1,930,329 | Vinar | Oct. 10, 1933 |
| 1,935,309 | Bleuel | Nov. 14, 1933 |
| 1,948,466 | Broecker | Feb. 20, 1934 |
| 2,007,698 | Tear | July 9, 1935 |
| 2,052,356 | Long | Aug. 25, 1936 |
| 2,161,084 | Peterson | June 6, 1939 |
| 2,175,426 | Blount | Oct. 10, 1939 |
| 2,291,922 | Russell | Aug. 4, 1942 |
| 2,302,057 | Ripley | Nov. 17, 1942 |
| 2,320,452 | Allenbaugh | June 1, 1943 |
| 2,481,593 | Hoe | Sept. 13, 1949 |